United States Patent [19]

Takizawa et al.

[11] Patent Number: 4,841,201

[45] Date of Patent: Jun. 20, 1989

[54] DISPLAY DEVICE INCLUDING FLYBACK TRANSFORMER CONSTRUCTED TO CONTROL LEAKAGE CURRENTS

[75] Inventors: Kazuyoshi Takizawa, Hiratsuka; Kiyoshi Watanuki, Yokohama, both of Japan

[73] Assignee: Hitachi, Ltd., Tokyo, Japan

[21] Appl. No.: 116,343

[22] Filed: Nov. 4, 1987

[30] Foreign Application Priority Data

Nov. 14, 1986 [JP] Japan ............................... 61-173941

[51] Int. Cl.[4] ............................................ H04N 3/195

[52] U.S. Cl. .................................... 315/411; 315/408; 363/20; 336/225

[58] Field of Search ........................ 363/20, 21, 61, 68, 363/126; 315/408, 411; 336/225, 180, 185

[56] References Cited

U.S. PATENT DOCUMENTS

| | | | |
|---|---|---|---|
| 3,881,204 | 4/1968 | Cox | 363/61 |
| 4,185,234 | 1/1980 | Baker | 315/411 |
| 4,204,263 | 5/1980 | Onoue | 363/68 |
| 4,388,568 | 6/1983 | Goseberg et al. | 315/411 |
| 4,406,978 | 9/1983 | Goseberg et al. | 363/126 |
| 4,660,139 | 4/1987 | Nellen et al. | 363/68 |

FOREIGN PATENT DOCUMENTS

| | | | |
|---|---|---|---|
| 80372 | 5/1985 | Japan | 315/411 |
| 20307 | 1/1986 | Japan . | |

*Primary Examiner*—William H. Beha, Jr.

*Attorney, Agent, or Firm*—Antonelli, Terry & Wands

[57] ABSTRACT

A stacked or laminated-layer type of flyback transformer includes a plurality of high voltage windings wound in regular order in a direction of the winding axis and arranged on the same core cylinder. The high voltage windings in the respective layers are connected in series with each other by diodes and so that a voltage is generated with a direction of stacking of these windings. A winding start position of the first layer high voltage winding nearest a primary winding is lagged with respect to the winding start positions of the second layer winding and subsequent layer winding. The winding start position of the first layer winding is selected to be the position of, for example, 0 to 25% when the winding width on the core cylinder is 100%.

8 Claims, 4 Drawing Sheets

DISPLAY DEVICE INCLUDING FLYBACK TRANSFORMER CONSTRUCTED TO CONTROL LEAKAGE CURRENTS

BACKGROUND OF THE INVENTION

The present invention relates to a display device including a charging section dc-wise connected to a commercial power source and a non-charging section dc-wise isolated from the commercial power source, and more particularly to a display device in which a leakage current generated between the charging section and the non-charging section is reduced.

A display device having a Braun tube (or CRT) is provided with a flyback transformer which generates a high anode voltage and a deflection yoke which includes a vertical deflection coil and a horizontal deflection coil. In such a display device, in order to eliminate an insulating type of power source transformer which effects a dc-wise isolation from a commercial power source, a drive transformer to drive a horizontal output circuit and the flyback transformer are utilized so that only the horizontal output circuit generating a high voltage is dc-wise connected with the commercial power source while the other circuits are dc-wise insulated from the commercial power source. A primary winding and a secondary winding of the flyback transformer are coupled by a capacitance formed therebetween. Therefore, a leakage current flows from the secondary winding (or non-charging section) toward the primary winding (or charging section) due to a potential difference between a flyback pulse generated at the primary winding and a flyback pulse generated at the secondary winding. On the other hand, since the horizontal deflection coil and the vertical deflection coil are arranged in proximity to each other at a neck portion of the CRT, a leakage current flows from the horizontal deflection coil (or charging section) toward the vertical deflection coil (or non-charging section). Also, between wirings or conductor patterns of a printed board may exist a leakage current which flows from the charging section toward the non-charging section due to a capacitive coupling depending on a potential difference. A conducting path which connects the ground point of the charging section and the ground point of the non-charging section with each other, is formed by the commercial power source and the ground point of an external device (for example, VCR or audio device) connected to the display device. A total value of those leakage currents should be not larger than 1 mA RMS in accordance with the Japanese law for the control of electric articles and not larger than 0.5 mA RMS in accordance with the UL standard of U.S.A. However, in a stacked or laminated-layer winding type of flyback transformer as disclosed by, for example, JP-A-No. 51-20307 or U.S. Pat. No. 3,381,204, there may be the case where the above-mentioned standards cannot be satisfied since a relatively large leakage current due to a capacitive coupling flows in the first layer of a secondary winding, one end of which is connected with a +B line directly (or through no diode).

SUMMARY OF THE INVENTION

An object of the present invention is to provide a display device in which a leakage current is small.

Another object of the present invention is to provide a stacked type of flyback transformer in which a leakage current between a primary winding and a secondary winding is small.

To that end, according to the present invention, a winding start position of the first layer of a secondary winding of a stacked type of flyback transformer is shifted or deviated to a winding end side thereof with respect to a winding start position of the second layer so that the polarity of a flyback pulse generated at a coil portion of the second layer opposing a primary winding without the first layer interposed therebetween is made different from that of a flyback pulse generated at the primary winding, thereby reducing a leakage current which may be generated between the primary and secondary windings of the flyback transformer.

DESCRIPTION OF THE PREFERRED EMBODIMENTS

Figure 1:
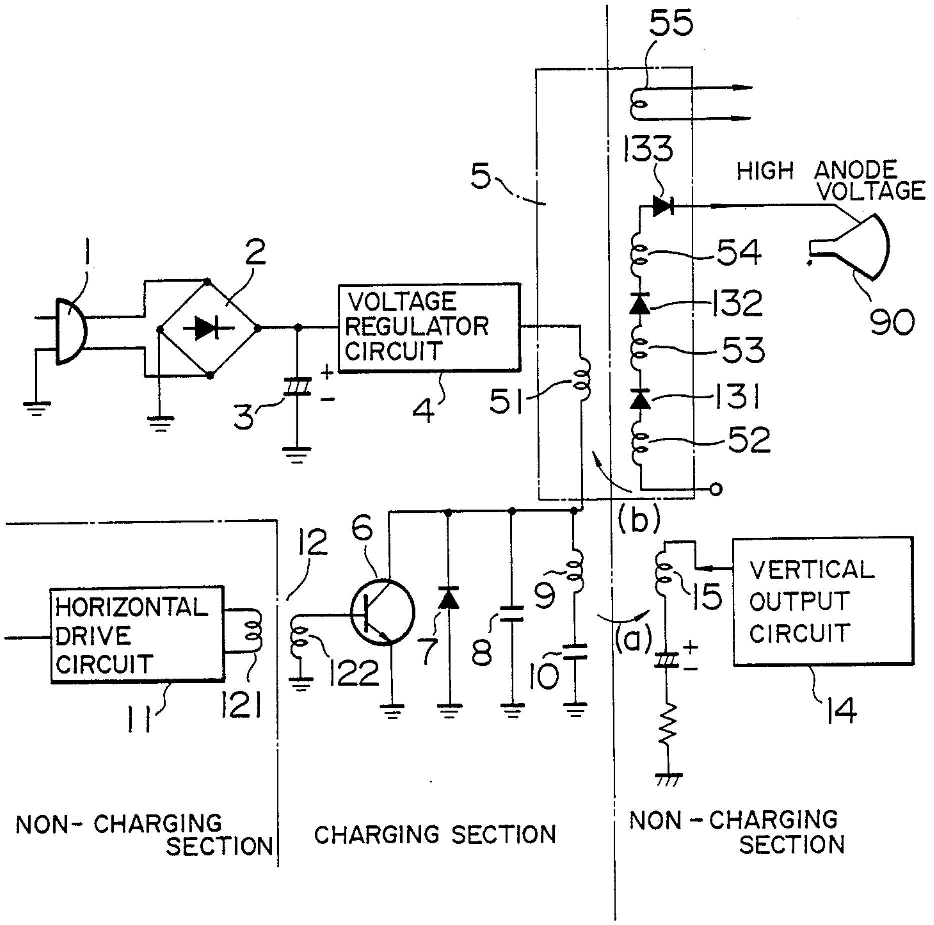
FIG. 1 is a circuit diagram showing an embodiment of the present invention.

In FIG. 1, a commercial ac voltage from a plug 1 is converted into a dc voltage by a bridge rectifier circuit 2 and a smoothing capacitor 3. The dc voltage is stabilized by a voltage regulator circuit 4 and then applied to one end of a primary winding 51 of a flyback transformer 5. To the other end of the primary winding 51 is connected a horizontal output circuit which includes a horizontal output transistor 6, damper diode 7, resonance capacitance 8, horizontal deflection coil 9 and S-character correction capacitance 10. A horizontal drive transformer 12 is provided between the horizontal output circuit and a horizontal drive circuit 11. A primary winding 121 and a secondary winding 122 of the horizontal drive transformer 12 are dc-wise insulated from each other so that the horizontal drive circuit 11 forms a non-charging section isolated from the horizontal output circuit. The flyback transformer 5 has three secondary windings 52, 53 and 54 the winding directions of which are the same and across which a high voltage for an anode of a Braun tube 90 is generated. Diodes 131 and 132 are respectively provided between the secondary windings 52 and 53 and between the secondary windings 53 and 54, and a diode 133 connected to the anode of the Braun tube 90 is provided at a high voltage terminal of the secondary winding 54. These diodes 131, 132 and 133 are arranged on the outermost periphery of the flyback transformer 5 and are molded into a united structure together with the windings.

Figure 2:
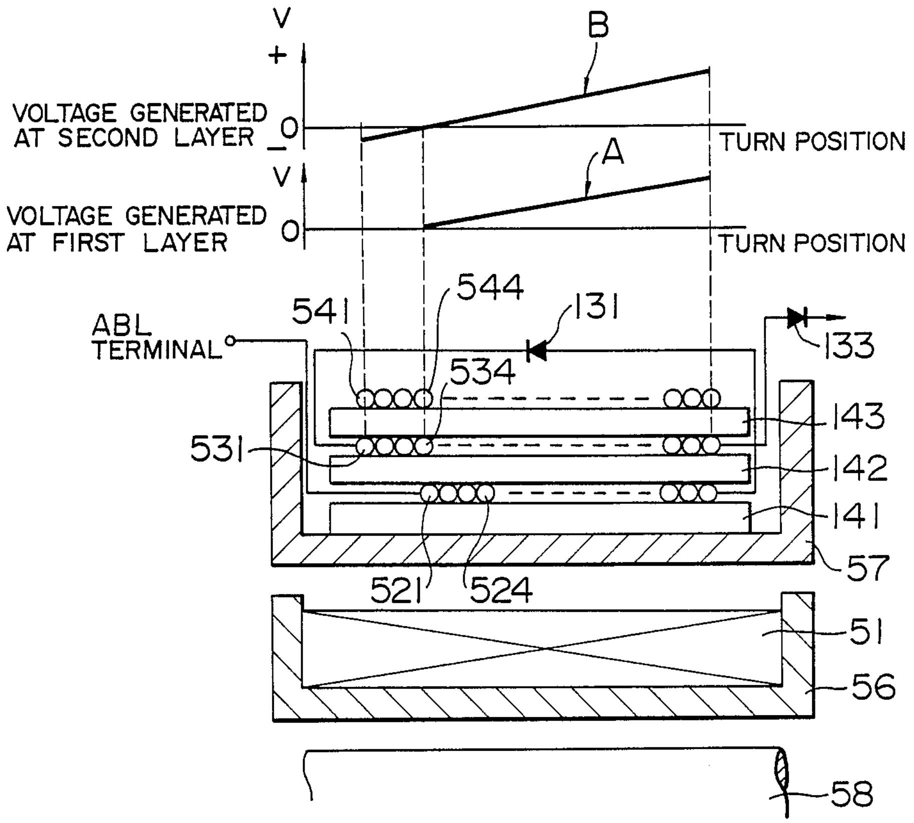
FIG. 2 is a cross-sectional view showing the structure of a flyback transformer.

The secondary windings 52, 53 and 54 are stacked and wound on insulating film sheets 141, 142 and 143, respectively, as shown in FIG. 2.

Circuits inclusive of a vertical output circuit 14 and the horizontal drive circuit 12 to be driven by relatively low voltages are driven by low dc voltages derived from a flyback pulse with a small amplitude generated at a tertiary winding 55 of the flyback transformer 5. Since the tertiary winding 55 is dc-wise insulated with respect to the primary winding 51, the circuits driven by the low voltages can be dc-wise insulated from a commercial power source. Accordingly, as shown in FIG. 1, the circuits in the display device can be divided into two sections, i.e. a charging section which includes the voltage regulator circuit 4 dc-wise connected to the commercial power source and the horizontal output circuit and a non-charging section which includes the other circuits dc-wise insulated from the charging section.

A vertical deflection coil 15 is provided in proximity to the horizontal deflection coil 9. Since a flyback pulse generated at the horizontal deflection coil 9 is far higher than a voltage generated at the vertical deflection coil 15, a leakage current as shown in (a) of FIG. 3 flows from the horizontal deflection coil 9 toward the vertical deflection coil 15.

Figure 3:
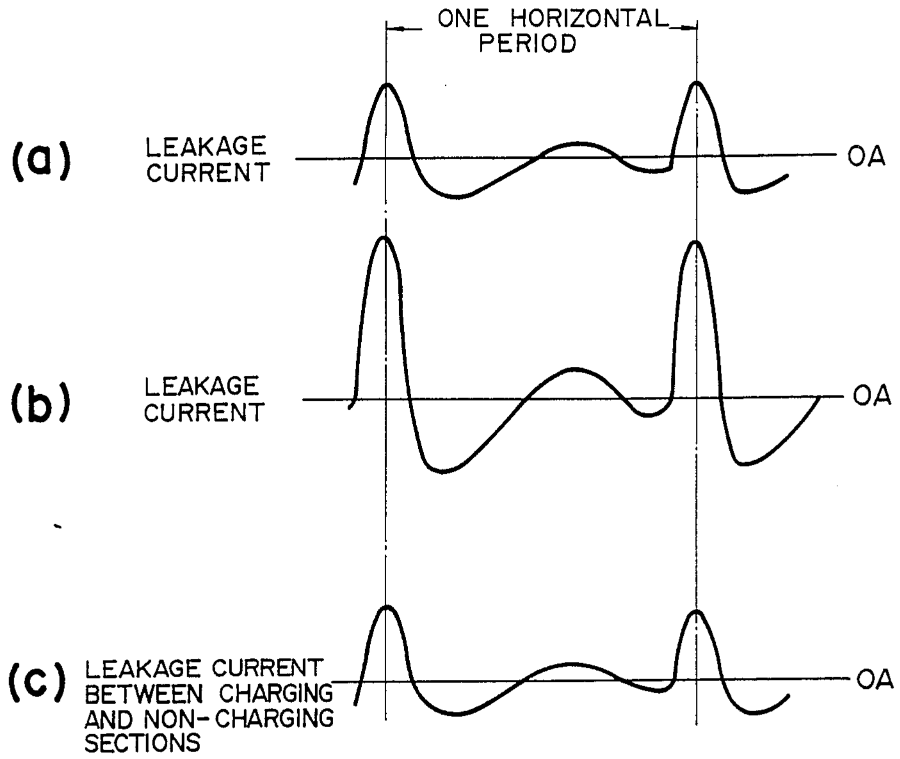
FIG. 3 shows waveforms of leakage currents.

On the other hand, a leakage current as shown in (b) of FIG. 3 flows from the high voltage generating secondary winding 52 toward the primary winding 51.

A difference between the currents shown in (a) and (b) of FIG. 3 results in a leakage current, as shown in (c) of FIG. 3, which appears between the charging section and the non-charging section, and this leakage current should be smaller than a predetermined value (for example, 1 mA RMS in accordance with the Japanese standard). Though the leakage current generated between the deflection coils and the leakage current generated between the primary and secondary windings of the flyback transformer are considered as typical examples of the leakage current, a leakage current may be generated between the wirings as another example.

If it is assumed that the leakage current generated in the display device results from only the leakage currents shown in (a) and (b) of FIG. 3, the value of the leakage current in the display device can be made to be zero by making the values (or peak values) of the currents shown in (a) and (b) of FIG. 3 equal to each other. For this purpose, it is required that either one of those currents can be set to a desired value. From this point of view, the present inventors have found that the leakage current in the flyback transformer depends on the winding start position of the first layer of the secondary winding (or winding 52).

Figure 4:
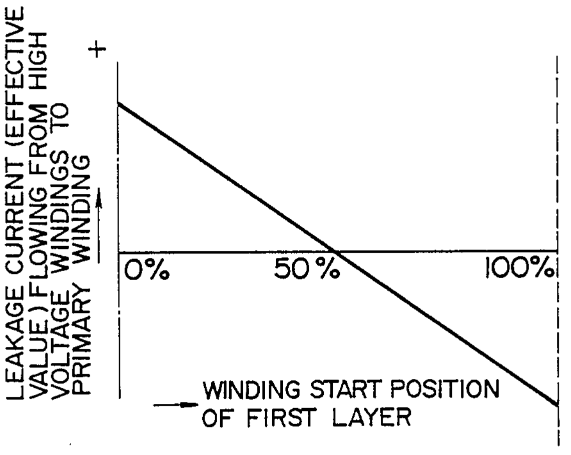
FIGS. 4 and 5 show relations between the winding start position of the first layer of a secondary winding and a leakage current.

Referring to FIG. 2, a core 58 is inserted into a hollow primary coil bobbin 56 and the primary winding 51 is wound on the bobbin 56. Outside the primary coil bobbin 56 is provided a secondary coil bobbin 57 on which an insertion paper 141, the secondary winding 52, an insertion paper 142, the secondary winding 53, an insertion paper 143, - - - are disposed successively from the inner side to the outer side. The winding start position of the first layer winding 52 (or the position of the first turn 521) is shifted from the positions of the first turns 531 and 541 of the second and third layer windings 53 and 54 toward the final turn side so as to coincide with the positions of the fourth turns 534 and 544 of the second and third layer windings 53 and 54. When a voltage generated at a turn corresponding to the position of the first turn 521 of the first layer (i.e. the turn 521 in the first layer and the turn 534 in the second layer) is rendered as a reference (or zero volt), voltages as shown by A and B in FIG. 2 appear at the first and second layers, respectively. The secondary windings bringing the leakage current are the portions thereof existing at the innermost periphery or the entire turns in the first layer and the first to fourth turns 531 and 534 in the second layer. The direction of the leakage current resulting from a negative voltage generated at the turns 531 to 534 is reverse to that of the leakage current resulting from a positive voltage generated at the first layer winding 52. Accordingly, the leakage current generated by the turns 521 to 524 in the first layer winding 52 is cancelled by the leakage current generated by the turns 531 to 534 in the second layer winding 53. As the winding start position of the first layer winding 52 becomes nearer the final turn side, the positive voltage decreases while the negative voltage increases. Therefore, the leakage current of the flyback transformer 5 changes, as shown in FIG. 4, depending on the position of the turn 521.

As a result, if the winding start position of the first layer is set so that a leakage current having a value equal to the valueof a leakage current of the entire display device except the flyback transformer and a direction reverse to the direction of that leakage current is generated in the flyback transformer, the leakage current of the display device can be made to be zero in principle.

Figure 5:
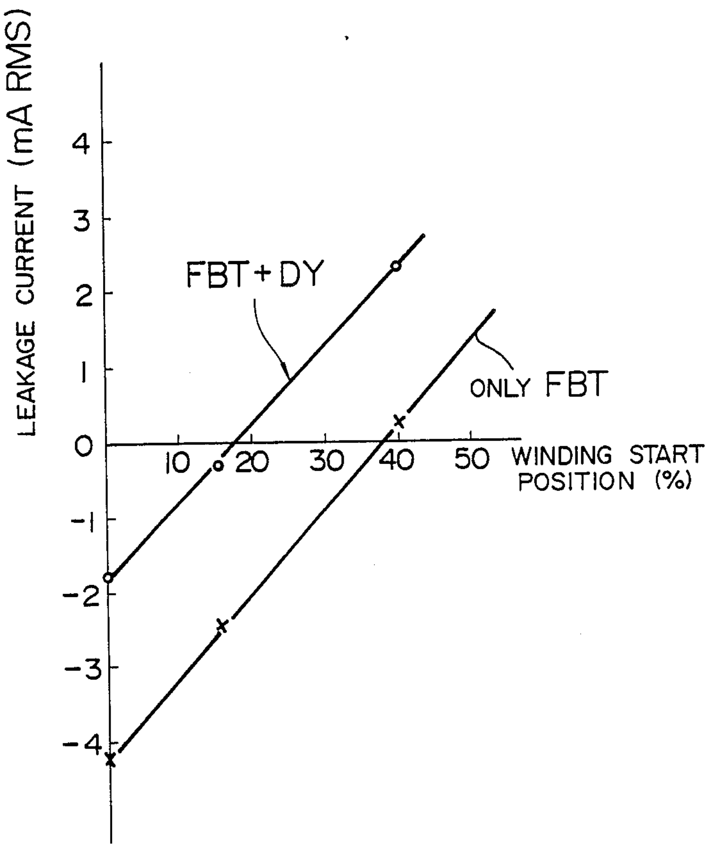

FIG. 5 shows the results of actual experiments in the case of a 24-inch color television receiver. In the illustrated example, a leakage current between the deflection coils was 1.8 mA RMS but there existed the other leakage current component from the charging section toward the non-charging section. Therefore, it was optimum that the winding starts from the position of 15%.

We claim:

1. A display device comprising:

a cathode ray tube;

a flyback transformer including a primary winding which is dc-wise connected to a commercial power source and a secondary winding which is dc-wise insulated from said primary winding and which generates a high voltage for an anode of said cathode ray tube;

a charging section which includes a horizontal deflection coil dc-wise connected to said primary winding, but does not include said primary winding; and a non-charging section which includes a vertical deflection coil dc-wise insulated from said primary winding, but not said secondary winding;

wherein said secondary winding includes a first layer winding and a second layer winding wound concentrically on said first layer winding, the winding start position of said first layer winding being shifted from the winding start position of said second layer winding toward the winding end side thereof by an amount such that a difference between a current leaking from said charging section into a said non-charging section and a current leaking from said secondary winding into said primary winding is not larger than 1 mA RMS, and the winding end position of said first layer winding extending at least to the winding end position of said second layer winding.

2. A display device according to claim 1, wherein said difference is not larger than 0.5 mA RMS.

3. A display device according to claim 1, wherein the current leaking from said charging section into said non-charging section includes a current which leaks from said horizontal deflection coil into said vertical deflection coil.

4. A display device according to claim 1, wherein a width of the shift of the winding start position of said first layer winding from the winding start position of said second layer winding is on the order of 10 to 20% of a winding width of said second layer winding.

5. A display device comprising:

a cathode ray tube;

a flyback transformer including a primary winding which is dc-wise connected to a commercial power source and a secondary winding which is dc-wise insulated from said primary winding and which generates a high voltage for an anode of said cathode ray tube;

a charging section which includes a horizontal deflection coil dc-wise connected to said primary winding, but does not include said primary winding; and a non-charging section which includes a vertical deflection coil dc-wise insulated from said primary winding, but not said secondary winding;

wherein sad secondary winding includes a first layer winding and a second layer winding wound concentrically on said first layer winding, the winding start position of said first layer winding being shifted from the winding start position of said second layer winding toward the winding end side thereof by an amount such that a difference between a current leaking from said charging section into a said non-charging section and a current leaking from said secondary winding into said primary winding is not larger than 1 mA RMS, wherein said shift width is on the order of 15% of the winding width of said second layer winding.

6. A display device comprising:

a cathode ray tube;

a flyback transformer including a primary winding is dc-wise connected ιo a commercial power source and a secondary winding which is dc-wise insulated from said primary winding and which generates a high voltage for an anode of said cathode ray tube, a first leakage current flowing from said secondary winding to said primary winding;

a charging section which includes a horizontal deflection coil dc-wise connected to said primary winding; and a non-charging section which includes a vertical deflection coil dc-wise insulated from said primary winding, a second leakage current flowing from said charging section to said non-charging section;

wherein said secondary winding of said flyback transformer includes means for setting the value and direction of said first leakage current to be substantially equal to the value and opposite to the direction of said second leakage current, so that a leakage current not larger than 1 mA RMS results, wherein said secondary winding includes a first layer winding and a second layer winding wound concentrically on a first layer winding, and said means for setting the value and direction of said first leakage current comprises means for positioning said first layer winding so that the winding start position of said first layer winding is shifted from the winding start position of said second layer winding toward the winding end side thereof by a predetermined amount, and the winding end position of said first layer winding extending at least to the winding end position of said second layer winding.

7. A display device according to claim 6, wherein said secondary winding includes a third layer winding wound concentrically on said second layer winding, the winding start positions of said second and third layer windings being in alignment with each other.

8. A display device comprising:

a cathode ray tube;

a flyback transformer including a primary winding is dc-wise connected to a commercial power source and a secondary winding which is dc-wise insulated from said primary winding and which generates a high voltage for an anode of said cathode ray tube, a first leakage current flowing from said secondary winding to said primary winding;

a charging section which includes a horizontal deflection coil dc-wise connected to primary winding; and a non-charging section which includes a vertical deflection coil dc-wise insulated from said primary winding, a second leakage current flowing from said charging section to said non-charging section;

wherein said secondary winding of said flyback transformer includes means for setting the value and direction of said first leakage current to a substantially equal to the value and opposite to the direction of said second leakage current, so that a leakage current not larger than 1 mA RMS results, wherein said secondary winding includes a first layer winding and a second layer winding wound concentrically on a first layer winding, and said means for setting the value and direction of said first leakage current comprises means for positioning said first layer winding so that the winding start position of said first layer winding is shifted from the winding start position of said second layer winding toward the winding end side thereof by a predetermined amount, wherein said predetermined amount is on the order of 15% of the winding width of said second layer winding.

* * * * *